United States Patent
Imai et al.

(10) Patent No.: US 7,769,253 B2
(45) Date of Patent: Aug. 3, 2010

(54) ELECTRONIC CIRCUIT DEVICE

(75) Inventors: Shigeki Imai, Nara (JP); Tomoyuki Nagai, Tenri (JP); Shunpei Yamazaki, Setagaya (JP); Jun Koyama, Sagamihara (JP)

(73) Assignees: Semiconductor Energy Laboratory Co., Ltd., Atsugi-shi, Kanagawa-ken (JP); Sharp Kabushiki Kaisha, Osaka-shi (JP)

( * ) Notice: Subject to any disclaimer, the term of this patent is extended or adjusted under 35 U.S.C. 154(b) by 2104 days.

(21) Appl. No.: 10/649,661

(22) Filed: Aug. 28, 2003

(65) Prior Publication Data

US 2004/0042707 A1    Mar. 4, 2004

(30) Foreign Application Priority Data

Sep. 2, 2002    (JP) .............................. 2002-257211

(51) Int. Cl.
G02B 6/12 (2006.01)
H04B 10/00 (2006.01)
H01L 27/14 (2006.01)

(52) U.S. Cl. ............................ 385/14; 398/140; 257/72
(58) Field of Classification Search ....................... None
See application file for complete search history.

(56) References Cited

U.S. PATENT DOCUMENTS

| | | |
|---|---|---|
| 3,348,056 A | 10/1967 | Kohashi |
| 3,976,877 A | 8/1976 | Thillays |
| 4,058,821 A | 11/1977 | Miyoshi et al. |

(Continued)

FOREIGN PATENT DOCUMENTS

| | | |
|---|---|---|
| CN | 1291792 | 4/2001 |
| DE | 19963165 | 3/2001 |
| EP | 0633542 | 1/1995 |

(Continued)

OTHER PUBLICATIONS

Tessler.N, "Lasers Based on Semiconducting Organic Materials," Adv. Mater. (Advanced Materials), 1999, vol. 11, No. 5, pp. 363-370.

(Continued)

*Primary Examiner*—Uyen-Chau N Le
*Assistant Examiner*—Chris H Chu
(74) *Attorney, Agent, or Firm*—Eric J. Robinson; Robinson Intellectual Property Law Office, P.C.

(57) ABSTRACT

An object of the present invention is to provide an electronic circuit device capable of reducing the occurrence of electromagnetic waves associated with the propagation of a signal by utilizing light as a signal. The electronic circuit device has a transparent substrate (hereinafter written as a substrate) over which an optical sensor and an optical shutter and an electronic circuit composed of thin film transistors (TFTs) are formed. An optical signal is inputted from an external into the electronic circuit device, the optical signal is directly irradiated on the optical sensor over the substrate, and penetrates through the substrate, and inputted into an optical sensor over another substrate. The optical sensor converts the optical signal into an electronic signal, and the circuit over the substrate operates. A control signal controls the optical shutter, a light is inputted from the external into this optical shutter, and whether it is transmitted or it is interrupted is determined, whereby the signal is taken out.

36 Claims, 10 Drawing Sheets

U.S. PATENT DOCUMENTS

| | | | |
|---|---|---|---|
| 4,612,083 A | 9/1986 | Yasumoto et al. | |
| 4,766,471 A | 8/1988 | Ovshinsky et al. | |
| 4,811,210 A | 3/1989 | McAulay | |
| 4,823,178 A | 4/1989 | Suda | |
| 4,830,444 A | 5/1989 | Cloonan et al. | |
| 4,843,587 A | 6/1989 | Schlunt et al. | |
| 4,851,695 A | 7/1989 | Stein | |
| 4,888,625 A | 12/1989 | Mueller | |
| 4,894,699 A | 1/1990 | Hayashi et al. | |
| 4,988,891 A | 1/1991 | Mashiko | |
| 5,008,554 A | 4/1991 | Asakawa et al. | |
| 5,077,752 A | 12/1991 | Tada et al. | |
| 5,095,380 A | 3/1992 | Kawai | |
| 5,164,955 A | 11/1992 | Meyers | |
| 5,200,631 A * | 4/1993 | Austin et al. | 257/570 |
| 5,249,245 A | 9/1993 | Lebby et al. | |
| 5,262,980 A | 11/1993 | Shannon | |
| 5,266,794 A | 11/1993 | Olbright et al. | |
| 5,268,679 A * | 12/1993 | Shannon | 345/4 |
| 5,271,030 A | 12/1993 | Chinen | |
| 5,291,324 A | 3/1994 | Hinterlong | |
| 5,297,232 A | 3/1994 | Murphy | |
| 5,339,090 A | 8/1994 | Crossland et al. | |
| 5,353,247 A | 10/1994 | Faris | |
| 5,357,122 A | 10/1994 | Okubora et al. | |
| 5,362,961 A | 11/1994 | Hamanaka | |
| 5,383,042 A | 1/1995 | Robinson | |
| 5,410,502 A | 4/1995 | Bird | |
| 5,478,658 A | 12/1995 | Dodabalapur et al. | |
| 5,483,263 A | 1/1996 | Bird et al. | |
| 5,488,735 A | 1/1996 | Tanabe et al. | |
| 5,491,571 A | 2/1996 | Williams et al. | |
| 5,502,837 A | 3/1996 | Hoffert | |
| 5,523,704 A | 6/1996 | So | |
| 5,546,209 A * | 8/1996 | Willner et al. | 398/43 |
| 5,569,610 A | 10/1996 | Zhang et al. | |
| 5,583,570 A | 12/1996 | Yamada | |
| 5,614,733 A | 3/1997 | Zhang et al. | |
| 5,654,559 A | 8/1997 | Spaeth et al. | |
| 5,705,829 A | 1/1998 | Miyanaga et al. | |
| 5,738,731 A | 4/1998 | Shindo et al. | |
| 5,783,468 A | 7/1998 | Zhang et al. | |
| 5,796,714 A | 8/1998 | Chino et al. | |
| 5,832,147 A | 11/1998 | Yeh et al. | |
| 5,848,214 A | 12/1998 | Haas et al. | |
| 6,111,902 A | 8/2000 | Kozlov et al. | |
| 6,140,165 A | 10/2000 | Zhang et al. | |
| 6,160,828 A | 12/2000 | Kozlov et al. | |
| 6,191,834 B1 | 2/2001 | Crossland et al. | |
| 6,509,614 B1 * | 1/2003 | Shih | 257/350 |
| 6,627,518 B1 | 9/2003 | Inoue et al. | |
| 6,627,953 B1 | 9/2003 | Vu et al. | |
| 6,642,073 B1 | 11/2003 | Zhang et al. | |
| 6,653,157 B2 | 11/2003 | Kondo | |
| 6,661,940 B2 | 12/2003 | Kim | |
| 6,730,933 B1 | 5/2004 | Shimizu et al. | |
| 6,878,607 B2 | 4/2005 | Inoue et al. | |
| 7,079,776 B1 * | 7/2006 | Shimoda et al. | 398/140 |
| 7,385,655 B2 | 6/2008 | Imai et al. | |
| 2001/0006503 A1 | 7/2001 | Braitberg et al. | |
| 2002/0009274 A1 | 1/2002 | Gharavi | |
| 2002/0027206 A1 | 3/2002 | Yuan et al. | |
| 2002/0158263 A1 | 10/2002 | Tanaka et al. | |
| 2002/0159487 A1 | 10/2002 | Thornton et al. | |
| 2003/0002826 A1 | 1/2003 | Cohen et al. | |
| 2003/0032210 A1 | 2/2003 | Takayama et al. | |
| 2003/0122137 A1 | 7/2003 | Hashimoto | |
| 2003/0139520 A1 | 7/2003 | Toyama et al. | |
| 2003/0162312 A1 | 8/2003 | Takayama et al. | |
| 2003/0201466 A1 * | 10/2003 | Ogawa et al. | 257/200 |
| 2003/0218174 A1 | 11/2003 | Verdonk et al. | |
| 2003/0218418 A9 | 11/2003 | Sato et al. | |
| 2004/0007706 A1 | 1/2004 | Yamazaki et al. | |
| 2004/0012016 A1 | 1/2004 | Underwood et al. | |
| 2004/0042707 A1 | 3/2004 | Imai et al. | |
| 2004/0061126 A1 | 4/2004 | Imai et al. | |
| 2004/0195572 A1 | 10/2004 | Kato et al. | |
| 2005/0006648 A1 | 1/2005 | Yamazaki et al. | |
| 2005/0012445 A1 | 1/2005 | Yamazaki et al. | |
| 2005/0020037 A1 * | 1/2005 | Asami et al. | 438/485 |
| 2005/0048320 A1 | 3/2005 | Kobayashi | |
| 2006/0082627 A9 | 4/2006 | Bright et al. | |
| 2006/0180826 A1 | 8/2006 | Yamazaki et al. | |
| 2007/0029548 A1 | 2/2007 | Yamazaki et al. | |

FOREIGN PATENT DOCUMENTS

| | | |
|---|---|---|
| EP | 0683623 | 11/1995 |
| EP | 1093166 | 4/2001 |
| EP | 1154676 | 11/2001 |
| EP | 1281690 | 2/2003 |
| JP | 57-106157 | 7/1982 |
| JP | 02-136805 | 5/1990 |
| JP | 02-262357 | 10/1990 |
| JP | 02-299259 | 12/1990 |
| JP | 05-037357 | 2/1993 |
| JP | 05-152608 | 6/1993 |
| JP | 05-343183 | 12/1993 |
| JP | 06-029924 | 2/1994 |
| JP | 06-347836 | 12/1994 |
| JP | 09-246509 | 9/1997 |
| JP | 10-051387 | 2/1998 |
| JP | 10-063807 | 3/1998 |
| JP | 11-243209 | 9/1999 |
| JP | 2000-058259 | 2/2000 |
| JP | 2000-058882 | 2/2000 |
| JP | 2000-277794 | 10/2000 |
| JP | 2001-189460 | 7/2001 |
| JP | 2001-267587 | 9/2001 |
| JP | 2002-100758 | 4/2002 |
| JP | 3397565 | 4/2003 |
| JP | 2003-168567 | 6/2003 |
| JP | 2004-096576 | 3/2004 |
| KR | 95-4420 | 4/1995 |
| KR | 1999-0077145 A | 10/1999 |
| WO | WO-97/25650 A | 7/1997 |
| WO | WO-98/50989 | 11/1998 |
| WO | WO-00/57489 | 9/2000 |
| WO | WO-01/33487 | 5/2001 |
| WO | WO-01/39554 | 5/2001 |
| WO | WO-01/64598 | 9/2001 |
| WO | WO-02/31882 | 4/2002 |
| WO | WO-02/071557 | 9/2002 |

OTHER PUBLICATIONS

European Search Report (Application No. 03009851) Dated Apr. 8, 2004.
Rogers.J et al., "Organic Smart Pixels and Complementary Inverter Circuits Formed on Plastic Substrates by Casting and Rubber Stamping," IEEE Electron Devices Letters, Mar. 2000, vol. 21, No. 3, pp. 100-103.
Wu.C et al., "Design of a Novel A-Si Pin/OLED Image Sensor & Display Device," SID Digest '99 : SID International Symposium Digest of Technical Papers, 1999, pp. 528-531.
Search Report (Application No. 03009851.1) Dated Jul. 1, 2004.
"Diffraction by a Periodic Structure," http://www.wias-berlin.de/people/schmidt/diffpage/index.html, Weierstrass Institute.
Maurer.M, "Crystalline Colloidal Array Fabrication," http://www.personal.psu.edu/mkm20/cca.html.
Office Action (Application No. 200410003980.7) Dated Apr. 20, 2007.
Office Action (Application No. 2003-0061155) Dated Sep. 25, 2009.

* cited by examiner

ELECTRIC CURRENT INCREASES
AS AMOUNT OF LIGHT INCREASES

ELECTRONIC CIRCUIT DEVICE

BACKGROUND OF THE INVENTION

1. Field of the Invention

The present invention relates to an electronic circuit device for light input, and particularly, relates to an electronic circuit device for light input, which is composed by forming a thin film transistor (hereinafter written as a TFT) over a transparent substrate such as substrate made of quartz, glass, plastic, or the like. Moreover, the present invention relates to an electronic device such as a computer or the like composed of the electronic circuit devices.

2. Description of the Related Art

At the present day, the informatization has been furthermore advanced with the improvement of electronic devices. It is expected that this tendency will be further promoted hereafter. In general, an electronic circuit device in wide spread use which configures an electronic device has the circuit over a printed circuit substrate (also called printed circuit board, hereinafter written as a printed circuit substrate). Specifically, a metal such as copper (Cu) or the like is plated over a substrate (also called board) made of glass epoxy or the like, and then, a wiring for electronic parts is formed by etching it. Then, after the printed circuit substrate has been formed, the electronic parts such as a Large Scale Integrated circuit (hereinafter written as an LSI), a resistance, a condenser or the like are inserted and connected by performing the soldering. As for such a printed circuit substrate, the method for fabricating it is easy and is frequently applied.

Moreover, on the other hand, the performance of electronic devices has been enhanced from the viewpoint of the operation speed, and further enhancement of the operation rate is required.

Figure 3:
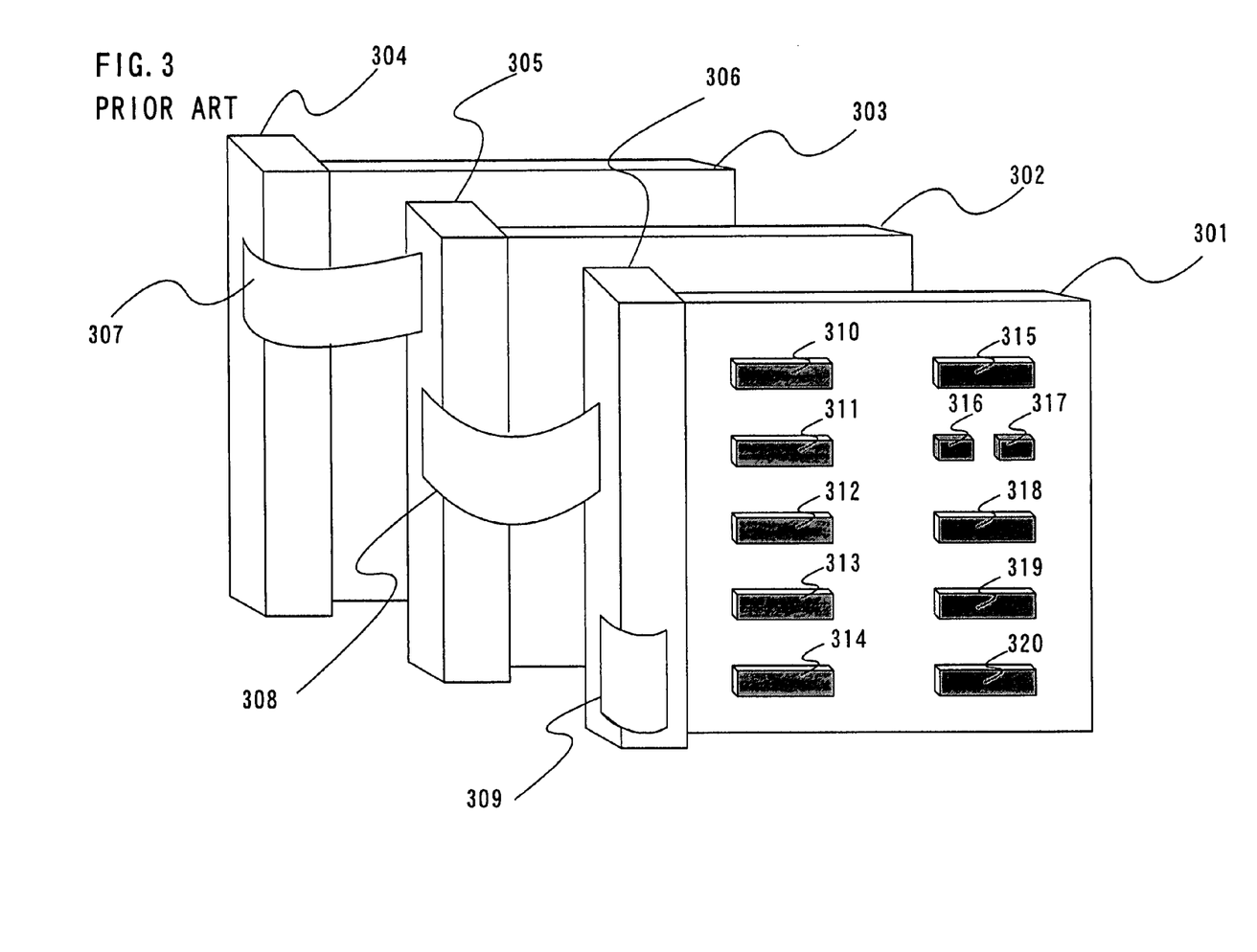
FIG. 3 is a diagram showing a conventional electronic circuit device.

In FIG. 3, a conventional electronic circuit device will be described below. The conventional electronic circuit device shown in FIG. 3 is configured with electronic substrates 301, 302, and 303. The electronic substrate 301 is fabricated by the procedure that a copper foil is patterned over a glass epoxy substrate, electronic parts 310 to 320 such as a LSI, a resistance, a condenser and the like are arranged and connected. Electronic substrates 302 and 303 are fabricated similarly. Moreover, the electronic substrate 301 is also inserted into sockets 304, 305 and 306, and the sockets are connected to each other via wirings 307, 308. And a wiring 309 is connected to an external circuit.

In the conventional electronic circuit devices as described above, there have been the following problems. First, there has been a case where a strong electromagnetic wave is generated from an LSI or the like which are mounted on the electronic circuit substrate. Moreover, a strong electromagnetic wave is also generated in a connecting line for connecting electronic circuit substrates as well as over the electronic circuit substrate. There have been problems that such an electromagnetic wave has a bad influence on the other electronic parts (not shown) which is located at the exterior of the electronic circuit device, causes malfunctions, worsens the performance, and so forth. Such problems have become prominent as the electronic circuit operates at a higher rate and as the scale of the electronic circuit is larger.

SUMMARY OF THE INVENTION

An object of the present invention is to solve the problems such as a occurrence of noises and a occurrence of malfunctions caused by such an electromagnetic wave. Additionally, in the conventional electronic circuit units, substrates are connected to one another with wirings; there are limitations to input signals in parallel and the signal frequency must be set high.

In order to solve the above-described problems, in the present invention, an electronic circuit substrate which configures an electronic circuit device is configured with a transparent substrate (hereinafter written as a substrate or a transparent substrate), a signal is inputted optically, an optical shutter and an optical sensor are provided and set over the transparent substrate, and a transmission and reception of a signal are performed using a light, whereby a occurrence of unnecessary electromagnetic waves is prevented. Further, more parallel processing is enabled by providing a number of optical sensors and optical shutters which receive light. In this way, the signal frequency is lowered and the electromagnetic waves can be reduced further.

An electronic circuit device of the present invention comprises a plurality of transparent substrates, and an optical sensor and an optical shutter are formed over the transparent substrate. An optical signal is inputted from an external to the electronic circuit device and the optical signal is directly irradiated on the optical sensor disposed over the transparent substrate, or the optical signal is transmitted through the transparent substrate and inputted into an optical sensor disposed over another substrate. The optical sensor converts the optical signal into an electronic signal, and a circuit disposed over the substrate is driven. A control signal controls the optical shutter, an input of light is carried out from the external to this optical shutter, and whether the light is transmitted through the optical shutter or the light is interrupted is determined, thereby taking out a signal. This control signal may be an output of the circuit over the substrate or a signal outputted from another circuit. In this way, an unnecessary occurrence of electromagnetic waves is prevented by performing the input and the output using the optical signal.

An electronic circuit device having an electronic circuit substrate over which an optical shutter and an optical sensor are disposed is characterized in that the electronic circuit substrate comprises a transparent substrate, an electronic circuit is formed over the transparent substrate, the electronic circuit includes a plurality of laminated thin film transistors (hereinafter thin film transistor is written as a TFT), an optical signal is inputted from an external, the inputted optical signal is inputted into the optical shutter or the optical sensor, the optical shutter controls transmission or non-transmission of the optical signal, and the optical sensor converts the optical signal into an electronic signal using the optical sensor and the electronic circuit over the transparent substrate.

An electronic circuit device having a configuration in which a plurality of electronic circuit substrates are superimposed, wherein an optical shutter and an optical sensor are disposed is characterized in that the electronic circuit substrate comprises a transparent substrate, an electronic circuit is formed over the transparent substrate, the electronic circuit includes a plurality of laminated TFTs, an optical signal is inputted from an external, the inputted optical signal is inputted into the optical shutter or the optical sensor over the transparent substrate, the optical shutter controls transmission or non-transmission of the optical signal, and the optical sensor converts the optical signal into an electronic signal by the optical sensor and the electronic circuit over the transparent substrate.

An electronic circuit device having an electronic circuit substrate over which an optical shutter and a plurality of optical sensors are disposed is characterized in that the electronic circuit substrate comprises a transparent substrate, an electronic circuit is formed over the transparent substrate, the electronic circuit includes a plurality of laminated thin film transistors, an optical signal is inputted from an external, the inputted optical signal is inputted into the optical shutter or the optical sensor over the transparent substrate, the optical shutter controls transmission or non-transmission of the optical signal, the plurality of optical sensors convert the optical signal into an electronic signal by the plurality of optical sensors and an electronic circuit over the transparent substrate, and the optical sensor is configured with a plurality of different semiconductor layers.

An electronic circuit device having an electronic circuit substrate over which an optical shutter and a plurality of optical sensors are disposed is characterized in that the electronic circuit substrate comprises a transparent substrate, an electronic circuit is formed over the transparent substrate, the electronic circuit includes a plurality of laminated TFTs, an optical signal is inputted from an external, the inputted optical signal is inputted into the optical shutter or the optical sensor over the transparent substrate, the optical shutter controls transmission or non-transmission of the optical signal, the plurality of optical sensors convert the optical signal into an electronic signal by the plurality of optical sensors and the electronic circuit over the transparent substrate, the optical sensor is configured with a plurality of different semiconductor layers, and controlled by TFTs formed with semiconductors which are different from each other, respectively.

The configuration of the electronic circuit device described above is characterized in that a TFT of a lowest layer of the plurality of laminated TFTs is crystallized by a heat treatment, and the TFT of another layer of the plurality laminated TFTs is crystallized by irradiating a laser beam.

The configuration of the electronic circuit device described above is characterized in that the plurality of laminated TFTs are crystallized by a heat treatment.

The configuration of the electronic circuit device described above is characterized in that the heat treatment is a heat treatment using a metal catalyst.

The configuration of the electronic circuit device described above is characterized in that the optical sensor over the transparent substrate includes an amorphous silicon photodiode, or an amorphous silicon phototransistor.

The configuration of the electronic circuit device described above is characterized in that the optical sensor over the transparent substrate includes a polysilicon (p-Si) photodiode, or a polysilicon phototransistor.

The configuration of the electronic circuit device described above is characterized in that the optical shutter comprising a liquid crystal which is sandwiched between two transparent substrates.

The configuration of the electronic circuit device described above is characterized in that a polarizing plate is disposed over the transparent substrate and the polarizing plate is disposed only nearby the optical shutter.

In a computer having a plurality of arithmetic and logic units comprising a plurality of TFTs which are laminated and formed over a transparent substrate and a plurality of storage devices, exchanges of electronic information between the substrates are performed by an optical shutter and an optical sensor which are controlled by TFTs.

In a computer having a plurality of arithmetic and logic units comprising a plurality of TFTs which are laminated and formed and a plurality of storage devices, exchanges of electronic information between the substrates are performed in parallel by an optical shutter and an optical sensor which are controlled by TFTs.

DETAILED DESCRIPTION OF THE PREFERRED EMBODIMENTS

Embodiment Mode

Hereinafter, an electronic circuit device of the present invention will be described in detail with reference to the drawings.

Figure 1:
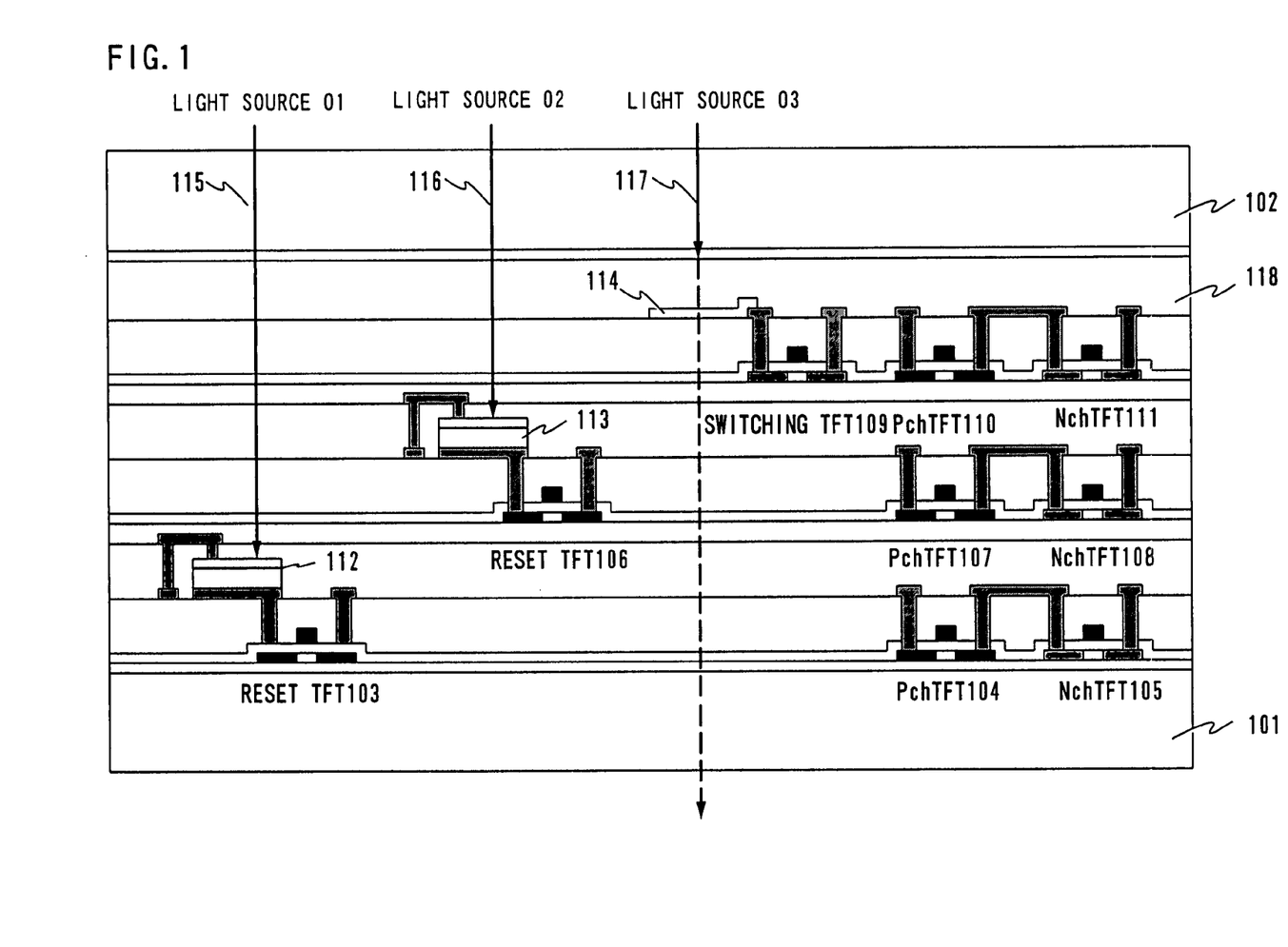
FIG. 1 is a diagram showing the configuration of an electronic circuit substrate of the present invention.

FIG. 1 shows a configuration of the present invention. In the present invention, an electronic circuit is formed over a transparent substrate such as a glass substrate, a quartz substrate, a plastic substrate and the like. In FIG. 1, an electronic circuit device of the present invention is configured with two transparent substrates 101 and 102 but it is possible to superimpose a multiple of such electronic circuit substrates.

An optical signal is inputted from an external light source (not shown) into the transparent substrates 102. In FIG. 1, optical signals are shown as beams 115, 116, and 117 over the transparent substrates 101 electronic circuits which are configured with a TFT and the like are formed. In FIG. 1, an electronic circuit is configured with TFTs 104, 105, 107, 108, 110 and 111 of CMOS.

Next, an input of a signal of the present invention will be described below. In the present invention, an input signal is inputted as an optical signal. In the present invention, an interface for input and output is configured with an input section and an output section. First of all, a light input section will be described below. An optical signal is inputted from external light sources 01 and 02. First, the optical signal emitted from the light source 01 is transmitted through the transparent substrate 102, and irradiated on an optical sensor 112 which is disposed over the transparent substrate 101. The optical sensor 112 converts the optical signal into an electronic signal, and outputs the electronic signal which is converted to an electronic circuit disposed over a layer where a TFT for reset (hereinafter written as a reset TFT) 103 is. The optical signal emitted from a light source 02 is transmitted through the transparent substrates 102, and irradiated on an optical sensor 113. The optical sensor 113 converts the optical signal into an electronic signal, and outputs the electronic signal which is converted to an electronic circuit over a layer where a reset TFT 106 is.

In this way, the optical signals inputted from the light sources 01 and 02 are converted into electronic signals over the transparent substrates by the sensors 112 and 113. Since it is eliminated that an electronic signal is redundantly decompressed as in the conventional example, problems such as noise and the like which have conventionally mattered can be eliminated.

Next, the configuration of an output section will be described. The output section is a portion that functions to take out outputs of the electronic circuit over the transparent substrates to an external. As for an optical signal inputted from a light source 03, it is determined whether the optical signal is transmitted through or not by an optical shutter 118 over a transparent electrode 114 controlled by a switching TFT 109. The optical shutter 118 is controlled by a signal of an electronic circuit disposed over the transparent electrode 114. When the optical shutter 118 has not transmitted the optical signal, the optical signal of the light source 03 is not transmitted to the external. Moreover, when the optical shutter 118 has transmitted the optical signal, the optical signal of the light source 03 is transmitted through the transparent substrates 101, and outputted to the external. Accordingly, the output of the electronic circuit becomes capable of being fetched to the external.

As described above, in the present invention, an electric wiring between substrates is not used, but an optical signal is used, thereby realizing a exchange of data of input-output. Owing to this, the problems such as noises caused by unnecessary electromagnetic waves as described above and the like can be solved.

Figure 2:
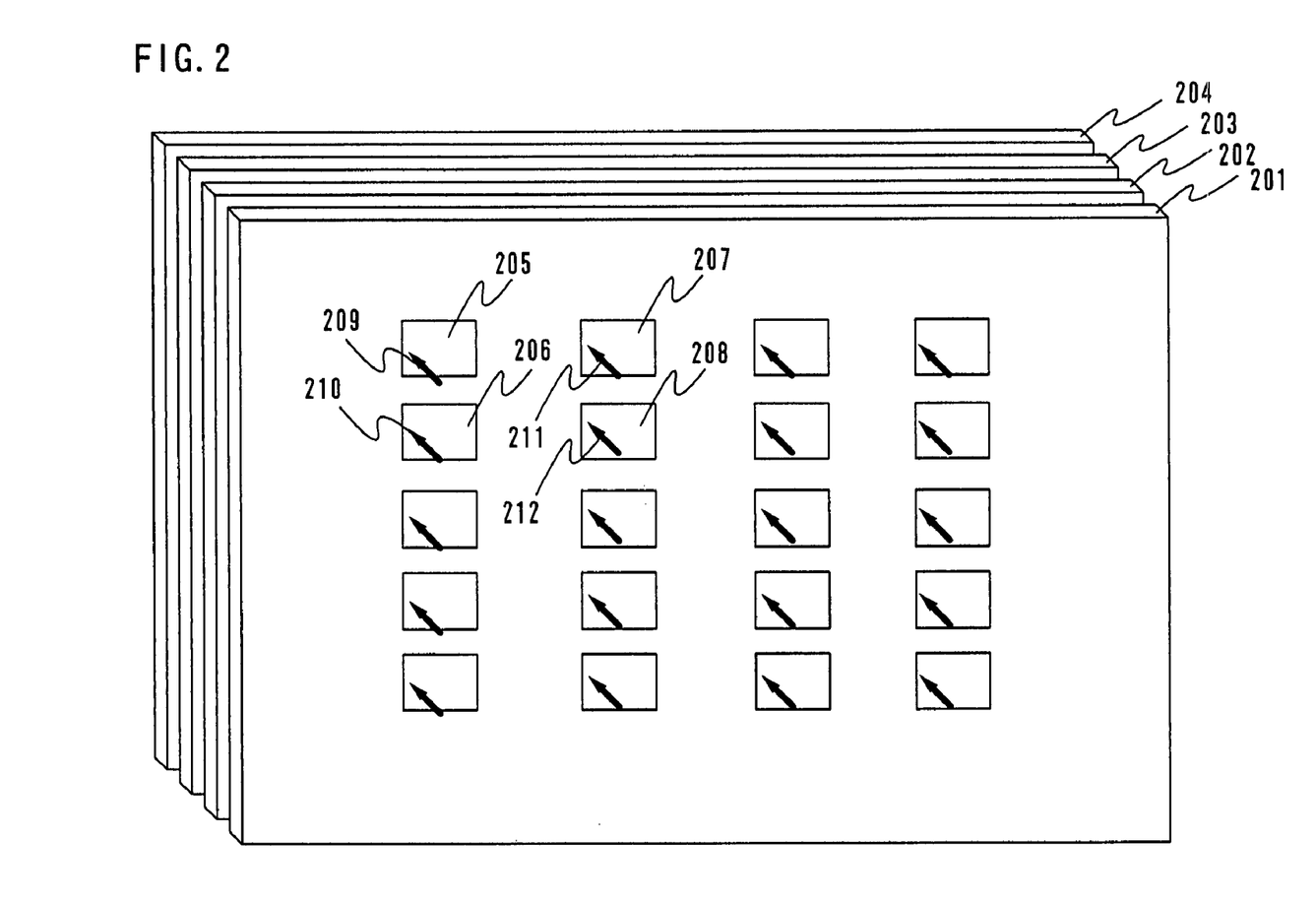
FIG. 2 is a diagram showing an electronic circuit device of the present invention.

What is shown in FIG. 2 is Embodiment Mode in which a plurality of electronic circuit substrates of the present invention are employed; a plurality of optical paths are disposed over most of the entire surface of the substrate including a area nearby a center. In this way, in the present invention, different from the conventional printed circuit substrate in which a signal is taken out with a wiring from end portions of the printed circuit substrate, it is possible to input and output signals from anywhere over the transparent substrate as long as the light is transmitted. Hence, the limitations of the number of wirings become less compared to those of the conventional printed circuit substrate, and many signals are capable of being processed in parallel.

As described above, when the number of signals which are processed in parallel is increased, a frequency of the signals is capable of being lowered. For example, in the case where 100 millions of data information units are transmitted per second, if the number of the transmission paths is 10, 10 millions of data information units must be transmitted through one transmission path, therefore, it is necessary to make the frequency 10 MHz, but if the number of the transmission paths is 1000, since only 100 thousands of data information units are transmitted through one path, the frequency can be lowered to the level of 100 KHz.

In this way, the frequency is capable of being lowered since many parallel processing are capable of being carried out, and the electromagnetic noises which have been a problem of the conventional techniques are capable of further being reduced. Moreover, FIG. 2 shows Embodiment Mode in the case where a computer is manufactured by utilizing the present invention, and it is configured with transparent arithmetic circuit substrate 201, transparent memory substrates 202, 203 and 204. An exchange performed between the arithmetic circuit and the memory circuit can be simplified by carrying out parallel processing using optical signals. Reference numerals 205, 206, 207 and 208 are arithmetic circuits which function as light interfaces, which receive the optical signal and convert it into an electronic signal. Reference numerals 209, 210, 211 and 211 are beams inputted via the light interfaces.

EMBODIMENTS

Embodiments of the present invention will be described below.

Embodiment 1

Figure 4:
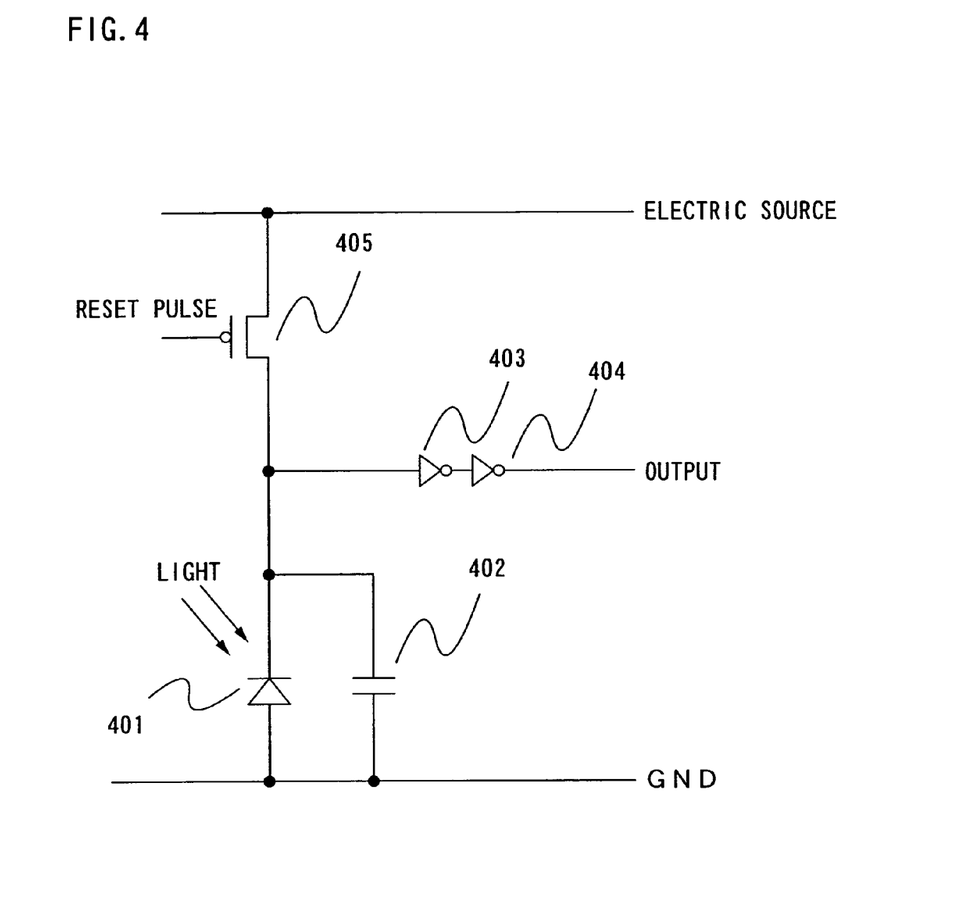
FIG. 4 is a circuit diagram of an optical sensor part of the present invention.

An optical sensor part will be described in detail. FIG. 4 shows a circuit diagram of an optical sensor part according to the present invention. In the present embodiment, the optical sensor is configured with a photodiode. An operation of the optical sensor part will be described below with reference to FIG. 4. First, a reset pulse is inputted into a reset transistor 405. Herein, since a TFT of P-channel polarity (hereinafter written as Pch) is used for this reset transistor, a signal is active-low. When the reset transistor 405 is turned ON, a cathode potential of a photodiode 401 is raised to the level of potential of an electric source. At this time, a storage capacitor of a capacitor 402 is also similarly raised to the level of potential of the electric source. This storage capacitor of the capacitor 402 may not be particularly mounted when a capacitance of the photodiode 401 is large. Next, a reset pulse becomes high, and the reset transistor 405 is turned OFF.

In the case where a light is not inputted, when amount of leakage of the reset transistor 405 and an inverter 403 for buffer is sufficiently small, the cathode potential of the photodiode 401 is held as it is.

Figure 5:
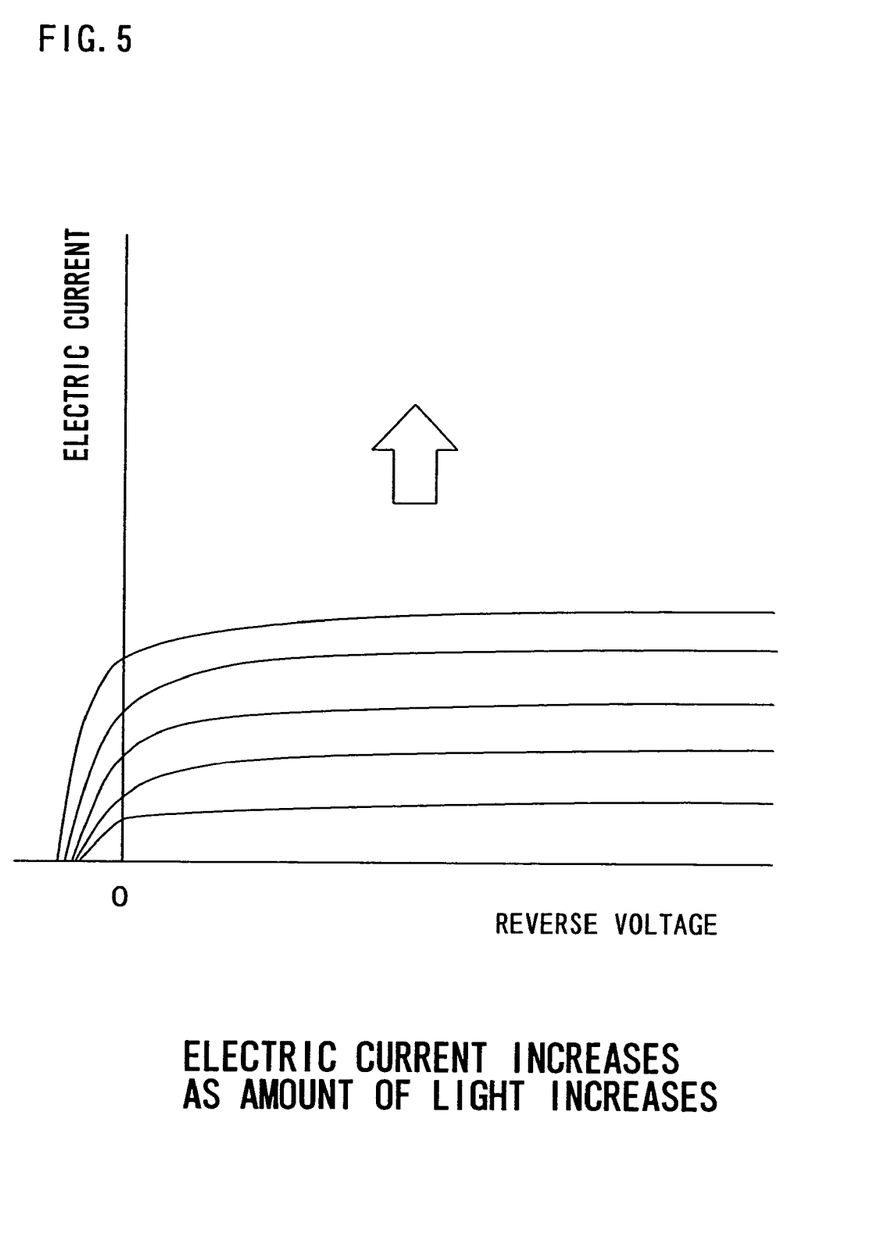
FIG. 5 is a schematic diagram showing voltage-current characteristics of a photodiode of an optical sensor part of the present invention.

Next, when a light is inputted, a current flows through the photodiode 401, and the charge of the storage capacitor is drawn to the ground (hereinafter written as GND). In this way, the output potential of the photodiode 401 is going to be lowered when the light is inputted, and is outputted via inverters 403 and 404, which lead to the output of the photodiode 401. In FIG. 5, a schematic diagram of the photodiode characteristic is shown. When a reverse voltage has been applied to the photodiode 401, approximately constant electric current flows regardless of voltage, and the electric current is controlled by an amount of light irradiated. The electric current increases as the amount of light irradiated increases. It should be noted that a photodiode of the present Embodiment of the present invention is not limited to a photodiode; a photo detector using other methods might be employed. Specifically, an optical sensor may be formed of amorphous silicon, polysilicon (p-Si), single crystal silicon, or other semiconductor materials. Moreover, as for an element structure, not only photodiode but also phototransistor may be used.

Figure 6:
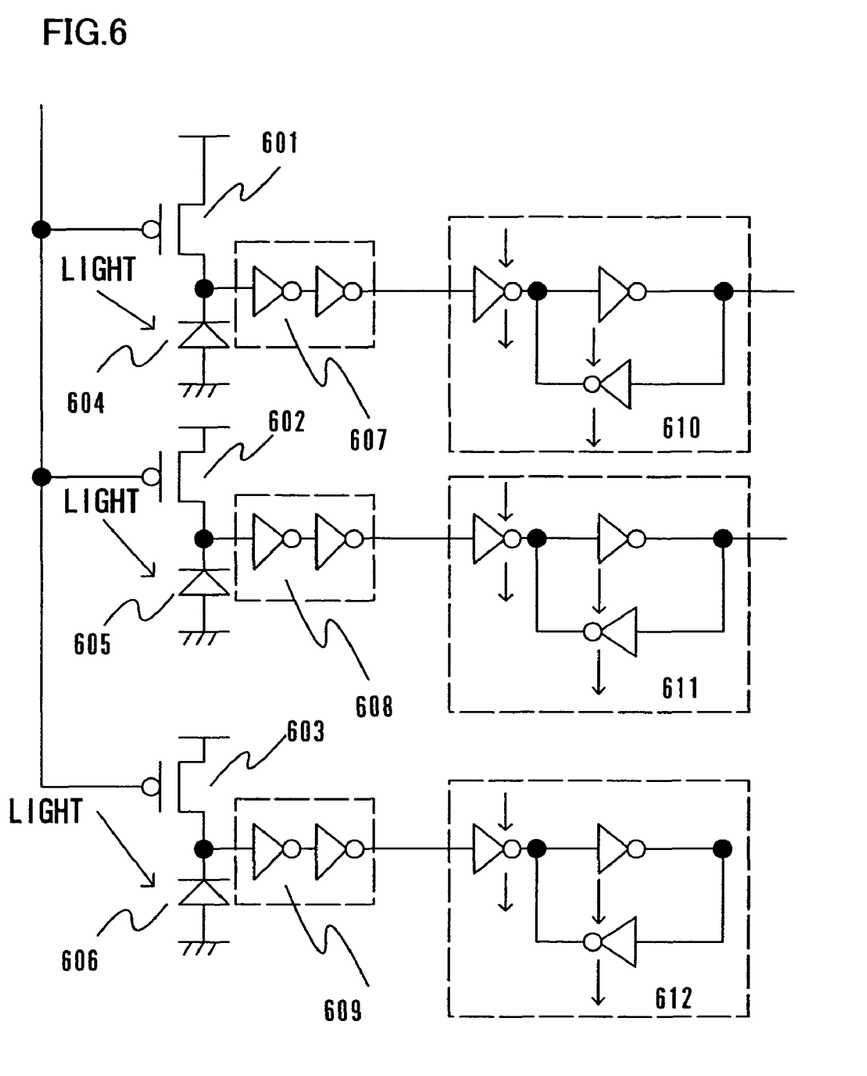
FIG. 6 is a circuit diagram of an optical sensor part and DFF (Delayed Flip Flop) of the present invention.

Moreover, in FIG. 6, Example of a circuit in which a plurality of photodiodes are used, its data is taken using a latch pulse and memorized is shown. FIG. 6 shows Example in which a plurality of circuits shown in FIG. 4 are disposed, Delayed Flip Flops (hereinafter written as DFFs) 610, 611 and 612 are connected after reset transistors 601, 602 and 603, photodiodes 604, 605 606, and buffer circuits 607, 608 and 609 are connected. FIGS. 7A, 7B, 7C, 7D, 7E and 7F show a timing chart of the circuit shown in FIG. 6. Hereinafter, an operation will be described with reference to FIGS. 7A, 7B, 7C, 7D, 7E and 7F.

Figure 7A:
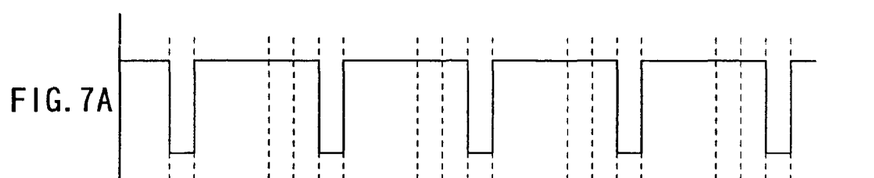
FIG. 7A to FIG. 7F are diagrams showing a timing chart of an optical sensor part and a DFF (Delayed Flip Flop) of the present invention.
Figure 7B:
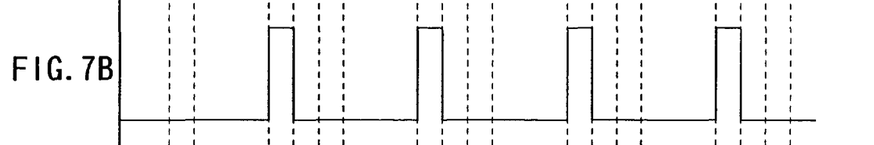
Figure 7C:
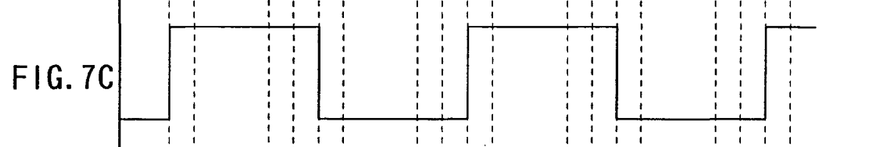
Figure 7D:
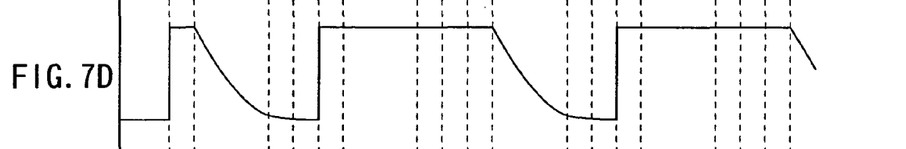

FIG. 7A shows a reset pulse for the purpose of driving the reset transistor 601, and as described above, in the case where a thin film transistor having P-channel polarity (hereinafter written as a Pch TFT) is employed for the reset transistor 601, it becomes active-low. When the reset transistor 601 is turned ON, a cathode potential of the photodiode 604 is raised up to a level of potential of an electric source. When the reset pulse becomes high, and the reset transistor 601 is turned OFF, the behavior after that is changed depending upon whether a light irradiation is carried out or not. FIG. 7C shows an existence of a light irradiation or non-existence of a light irradiation, in the case where the reset pulse is high, it represents that a light irradiation is carried out, and in the case where the reset pulse is low, it represents that the light irradiation has not been carried out. FIG. 7D shows the cathode potential of the photodiode 604, and in the case where a light irradiation has been carried out, the voltage is going to be lowered as well as the reset transistor 601 is turned OFF.

Figure 7E:
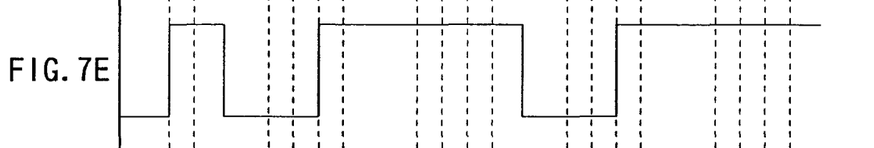
Figure 7F:
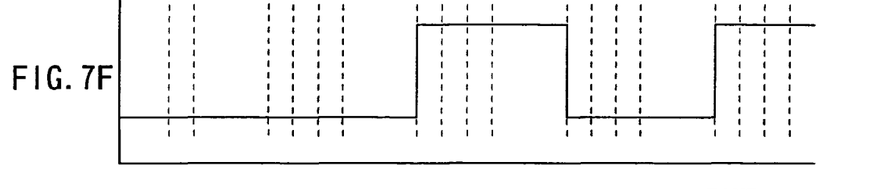

In FIG. 7E an output of the photodiode 604 is transmitted through the buffer circuit 607, the cathode potential of the photodiode 604 is turned in reverse around the intermediate point between the electric source and the GND (ground=0), and an output of the buffer circuit 607 is changed from a high potential to a low potential. On the other hand, in the case where a light irradiation is not performed, since the photodiode 604 does not electrically discharge, when the reset transistor 601 is turned OFF, the cathode potential of the photodiode 604 is held as it is, and the output of the buffer circuit 607 remains as it is. FIG. 7B shows a latch pulse, when the latch pulse is high, the output of the buffer circuit 607 is inputted into the DFF 610, and the output of DFF (shown in FIG. 7F) is held until the latch pulse is inputted subsequently. In this way, the irradiated optical signal is converted into an electronic signal.

Embodiment 2

In the present Embodiment, an optical shutter is formed by using liquid crystal. As is generally known, a liquid crystal panel is fabricated by injecting a crystal liquid material into the cell gap in width of several μm, a transmittance of a light is controlled by an applied voltage and the liquid crystal functions as an optical shutter. The entire surface of a substrate does not need the function of crystal liquid necessarily, however, since the fabrication of the substrate becomes easier when a crystal liquid is injected over the entire surface of the substrate, in the present Embodiment, a crystal liquid has been injected. Although the fabrication becomes complex, a configuration in which the liquid crystal is eliminated from a light input section is also capable of being employed. In such a case, only a portion where an optical shutter exists is surrounded with a sealing material, and a liquid crystal may be injected only into that portion.

Figure 8:
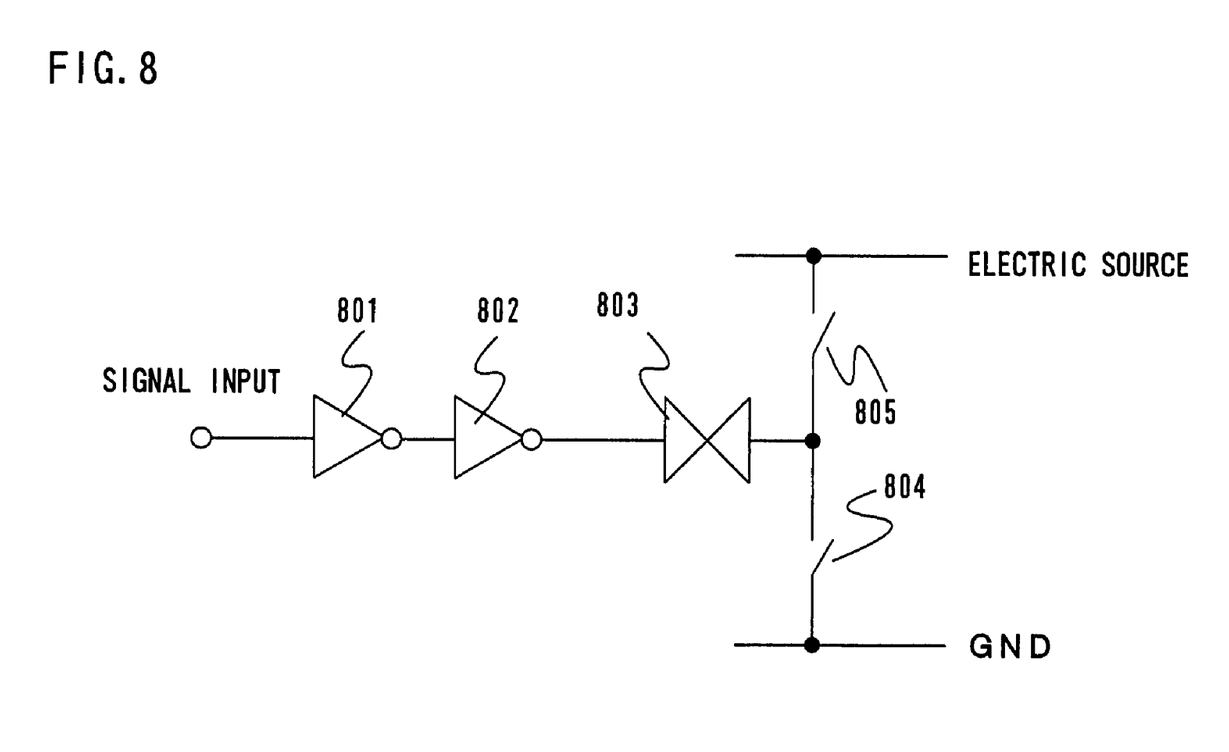
FIG. 8 is a circuit diagram of an optical shutter part of the present invention.

FIG. 8 shows a circuit diagram of a portion that is to be an optical shutter. Since it is not necessary to use an intermediate voltage as an active drive of a Twisted Nematic liquid crystal (hereinafter written as a TN liquid crystal) which represents a half tone using the intermediate section in the characteristic of transmittance versus applied voltage, the voltage for applying to the liquid crystal may be binary. Hence, a liquid crystal material which is endurable for a high rate operation such as Ferro Electric Liquid Crystal (hereinafter written as a FLC) and the like, that are endurable for higher rate operation than a TN liquid crystal is capable of being used. Needless to say, in the case where a higher response rate is not required, a TN liquid crystal and the like may be employed.

Further, a polarizing plate may be placed over the entire surface of an substrate, however, it is preferable that patterning to be performed and the polarizing plate be placed solely at the optical shutter part so that a light efficiency to the optical sensor becomes well.

In FIG. 8, a liquid crystal element 803 is driven via a buffer circuit constituted of inverters 801 and 802 using a control signal which opens and closes the optical shutter. When a switch 804 is turned ON, and a switch 805 is turned OFF, a control signal is at a high value, and when a material which shows normally white mode is used for a liquid crystal, the liquid crystal optical shutter interrupts a light. When the control signal is at the low value, since the applied voltage to the liquid crystal is 0V, the optical shutter transmits the light.

Since liquid crystal elements deteriorate when a specific voltage is applied for a long time, the voltage applied to the liquid crystal is turned in reverse by means of switches 804, 805. In this case, since a display is not seen by human beings as an usual liquid crystal display device, it is not necessary to turn in reverse at a frequency equal to or more than 60 Hz as a flicker countermeasures. It may be lower frequency. Moreover, when it is a liquid crystal material which tends to be less deteriorated even if a specific voltage is applied, it is also possible to stop turning in reverse. Moreover, in the case where the turning in reverse drive of the liquid crystal is performed, it is also necessary to turn the control signal in reverse along with the reverse signal.

Figure 9:
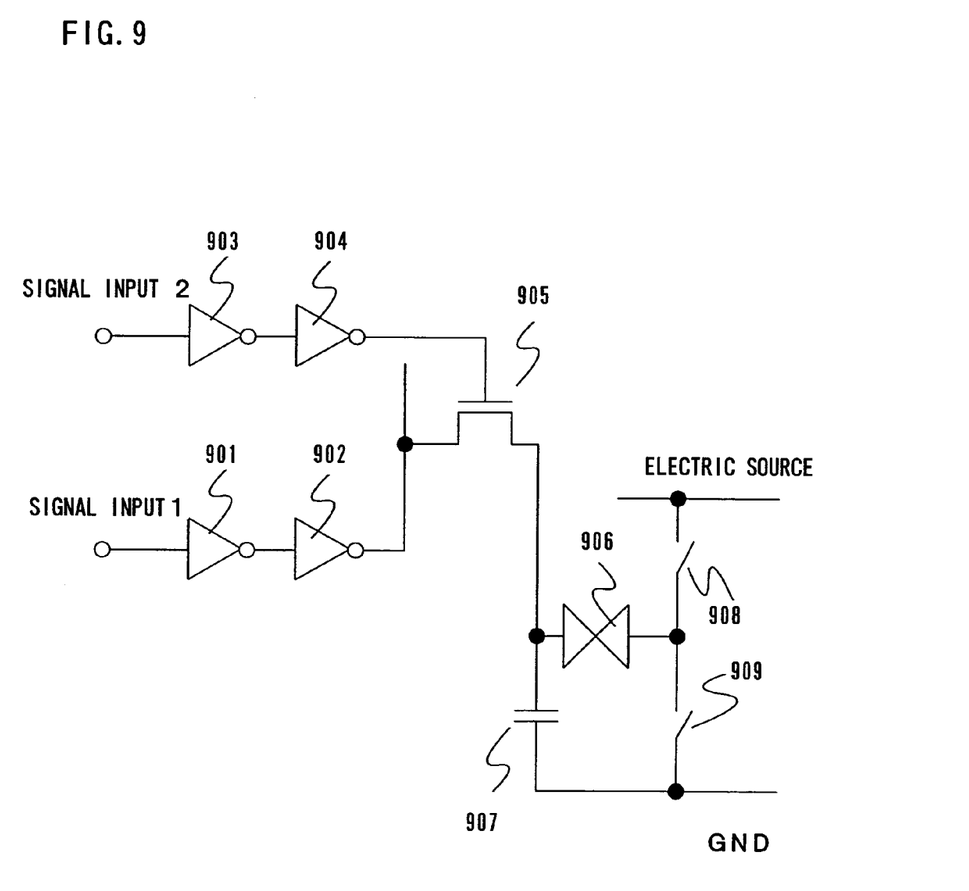
FIG. 9 is a circuit diagram of an optical shutter part of the present invention.

In FIG. 9, an example in the case where a DRAM type drive is performed using a switching transistor and a capacitor so that it may be used in an active matrix type liquid crystal display device is shown. A control signal for opening and closing the optical shutter is inputted from a control signal input 1. Moreover, a signal for writing (hereinafter written as a write signal) a control signal into a liquid crystal element 906 and a storage capacitor of a capacitor 907 is inputted from a control signal input 2. When a high value is inputted into the control signal input 2, a output potential of a buffer circuit constituted of inverters 903 and 904 is written into a transistor for writing (hereinafter written as a write transistor) 905, the write transistor 905 is turned ON, and a potential of the liquid crystal 906 is connected to a buffer circuit of the control signal 1, an output potential of the buffer circuit constituted of inverters 901 and 902 is written into the liquid crystal 906 and the storage capacitor of the capacitor 907. In this example, it is necessary to refresh by turning ON the write transistor 905 periodically similarly to the DRAM. Switches 908, 909 have a function for the purpose of preventing the liquid crystal material from being deteriorated similarly to FIG. 8.

Embodiment 3

Figure 10:
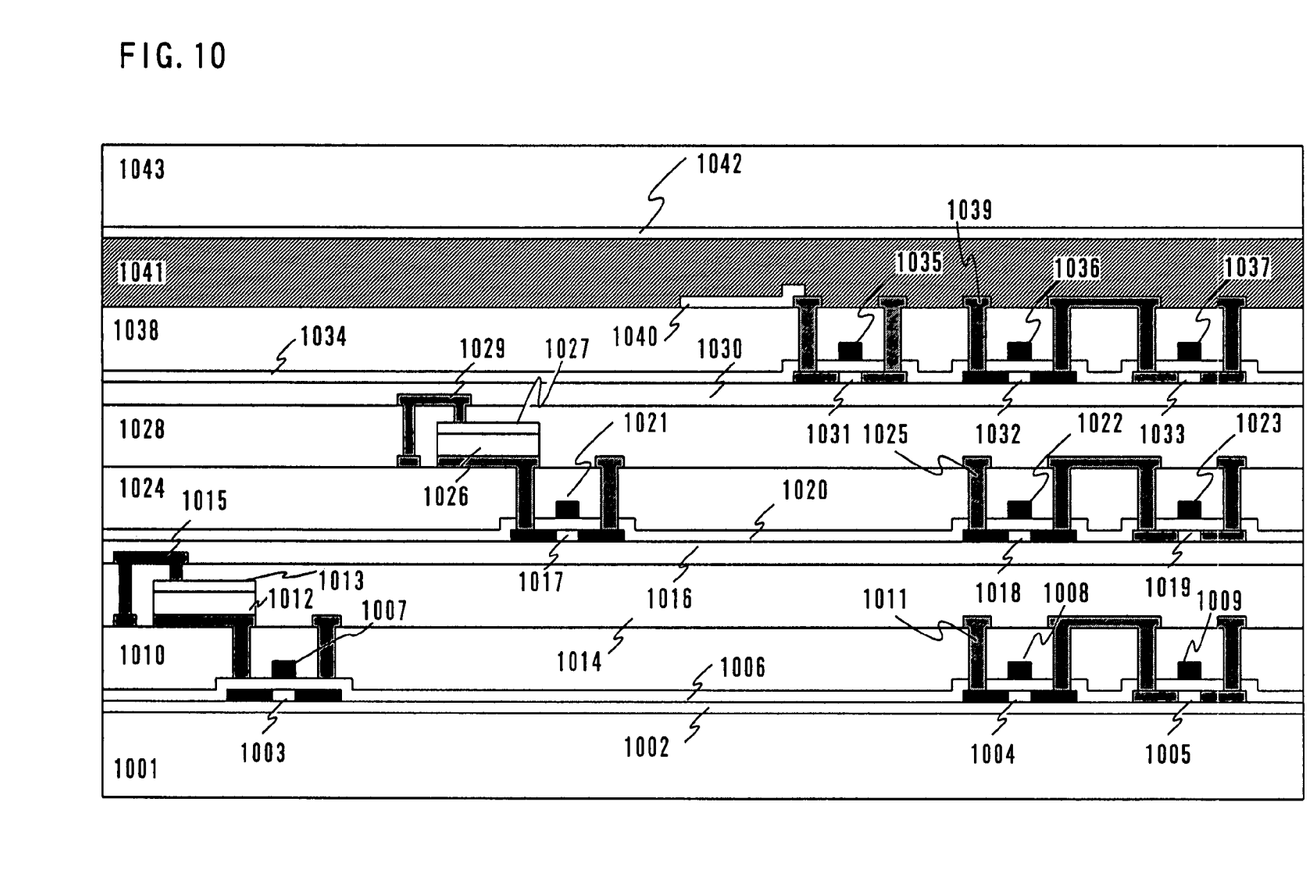
FIG. 10 is a cross sectional view of an electronic circuit substrate of the present invention.

The steps according to the present invention will be described referring to a cross sectional view in FIG. 10. In FIG. 10, an optical sensor is configured with a TFT and an amorphous silicon photodiode, and an optical shutter is configured with a crystal liquid. In the present Embodiment, the TFT and the photodiode is formed by the following method. First, an overcoating film 1002 is formed over the glass substrate 1001. As for this film, an oxide film or a nitride film is formed by a Chemical Vapor Deposition method (hereinafter written as a CVD method). Next, an amorphous silicon is similarly formed into a film by a CVD method. The amorphous silicon film is crystallized by a laser annealing method, or a thermal annealing method. In this way, a polysilicon (p-Si) film can be formed. Next, TFT islands 1003, 1004 and 1005 are formed by patterning the polysilicon film. Then, a gate insulator 1006 is formed by a CVD method.

Then, as a method for forming a gate electrode, a metal which is to be a gate electrode is formed into a film by a sputtering method using Al (Aluminum), Ta (Tantalum), W (Tungsten) or the like. After patterning and forming gate electrodes 1007, 1008 and 1009, an impurity for source and drain is doped using a mask by means of a photoresist. After doping an impurity for N-channel polarity (hereinafter written as Nch) to the island 1005, and doping an impurity for P-channel polarity (hereinafter written as Pch) to islands 1003 and 1004, the activation of the impurities are performed by a laser annealing method or a thermal annealing method. Subsequently, a first inter layer film 1010 is formed and a contact hole is opened.

Furthermore, source and drain electrodes 1011 are formed by forming metal films for source and drain and patterning them. The metal film is composed of a barrier metal and aluminum. A reset TFT and a CMOS TFT for a circuit are formed by the procedure described above. Next, an amorphous silicon film 1012 which is to be a photodiode is formed over the metal film, and further, as a transparent electrode 1013, Indium Tin Oxide (hereinafter written as an ITO) is formed into a film, the amorphous silicon film and the ITO film are patterned and etched in series, thereby forming a photodiode. Next, a second inter layer film 1014 is formed and a contact hole is opened. And further, a metal film 1015 is formed, and a wiring is formed. The wiring is formed for the purpose of connecting photodiode electrodes.

Next, a third inter layer film 1016 is formed and a flattening is carried out by a Chemical Mechanical Polishing method (hereinafter written as a CMP method). Then, amorphous silicon is formed into a film, and the crystallization is carried out by irradiating a laser beam. At this time, it is desirable that the laser is not irradiated on the amorphous silicon for photodiode. Islands 1017, 1018 and 1019 are formed by patterning the crystallized silicon. Next, a gate insulator film 1020 is formed. Furthermore, a metal film for a gate electrode is formed and patterned, thereby forming gate electrodes 1021, 1022 and 1023. Subsequently, a p-type impurity is doped to the islands 1017, 1018 and a n-type impurity is doped to the island 1019, and then, the activation of them is carried out by irradiating a laser beam. Furthermore, a fourth inter layer film 1024 is formed, the contact hole is opened, a metal film for source and drain is formed and patterned thereby forming an electrode 1025. Next, amorphous silicon film 1026 is formed into a film and an ITO as a transparent electrode 1027 is formed into a film. Then, a photodiode is formed by patterning and etching. Furthermore, a fifth inter layer film 1028 is formed, a contact hole is opened, a metal film is formed and patterned, thereby forming a wiring 1029. Next, after forming a sixth inter layer film 1030, a flattening is carried out by a CMP method.

Furthermore, an amorphous silicon film is formed, and the crystallization of it is carried out by irradiating a laser beam. At this time, it is desirable that the laser beam is not irradiated on the amorphous silicon film 1012, 1026. Next, the silicon is patterned and etched, thereby forming islands 1031, 1032 and 1033. Subsequently, a gate insulator film 1034 is formed; a metal film for a gate electrode is formed; patterned and etched, thereby forming gate electrodes 1035, 1036 and 1037. Next, a seventh inter layer film 1038 is formed; a contact hole is opened; a metal film for source and drain is formed and patterned, thereby forming an electrode. Next, an ITO is formed into a film and patterned, thereby forming a transparent electrode 1040 for the optical shutter. The substrate on the side of the TFT (hereinafter written as a TFT substrate) is completed by the procedure described above. Next, a substrate on the opposite side is fabricated. As for a counter substrate, a counter electrode 1042 is formed into a film over a glass substrate 1043. In FIG. 10, although the counter electrode is formed into a film over the entire surface of it, it may be formed only over the portion of the optical shutter.

Although it is not shown, the respective TFTs are capable of being electrically connected with each other by connecting the metal layer of the electrode 1015, the metal layer of the electrode 1021, the metal layer of the gate electrode 1029 and the electrode layer of the gate electrode 1035 via the contact holes. Moreover, the connection using a signal is also capable of being optically performed by forming a light-emitting element inside of it.

Finally, the TFT substrate and the counter substrate are pasted together and a liquid crystal 1041 is injected between them and sealed. Owing to this, the liquid crystal over the transparent electrode 1040 is capable of controlling the transmission and the non-transmission of the light by controlling the potential of the transparent electrode 1040.

Embodiment 4

In Embodiment 3, a thin film transistor is formed over a glass substrate, however, in the case where quartz substrate is used as a transparent substrate and an optical sensor is formed with a polysilicon (p-Si), a crystallization of the TFTs of the second layer and thereafter is capable of being realized not only by a laser beam but also by Solid Phase Crystallization (hereinafter written as SPC). This is since in a quarts substrate, the substrate shrink is not a problem at SPC temperature. Moreover, for SPC, a method of crystallizing using a metal catalyst by utilizing a known method may be employed.

Embodiment 5

In the present invention, as described above, since the connection between substrates at any position over a substrate is capable of being performed using an optical signal, an exchange of signals is capable of being carried out without being limited by a layout of the substrates. As for the connection between the arithmetic circuit and the memory circuit, the exchange of signals is capable of being carried out without using the external bus wirings. Moreover, a number of exchanges between the substrates can be also markedly increased comparing to that of the conventional exchanges using conventional printed circuit substrates. In this way, by utilizing the present invention, a massively parallel processing computer is capable of being configured.

Since all of the outputs of memory circuits and the like can be outputted in the orthogonal direction with respect to the transparent substrate in a parallel processing computer using the present invention, the conventional failures in taking out the memory contents in serial order, that is, for example, such problems as the frequency increasing, a circuit for calling becoming complex and the like can be solved.

As described above up to this point, in the present invention, an electronic circuit is formed with a TFT over a transparent substrate made of glass or plastic, not over a printed circuit substrate, and a electromagnetic noises generated from a signal line of an electronic circuit are capable of being reduced by utilizing an optical signal, not using an electronic signal for inputting and outputting signals. Moreover, conventionally, the input and output of a signal have been performed into and from the periphery of the printed circuit substrate, however, in the present invention, since input and output of a signal is capable of being performed into and from any position over the substrate by transmitting an optical signal, a parallel processing of the signal is capable of being carried out. In this way, the present invention has an effect of being capable of performing more parallel processing by means of optical signals.

It will also be appreciated that, although a limited number of embodiments of the invention have been described in detail for purposes of illustration, various modifications may be made without departing from the spirit and scope of the invention. Accordingly, the invention should not be limited except as by the appended claims.

What is claimed is:

1. An electronic circuit device comprising:
   an electronic circuit substrate over which an optical shutter, an optical sensor, and an electronic circuit including a plurality of laminated layers, wherein each of the plurality of laminated layers include thin film transistors, are disposed,
   wherein the electronic circuit substrate is a transparent substrate,
   wherein said optical shutter controls transmission or non-transmission of a part of an optical signal from an outside,
   wherein the optical sensor is connected to an electric source through a thin film transistor, and connected to a buffer,
   wherein said optical sensor converts another part of said optical signal into an electronic signal, and
   wherein said electronic signal is inputted into the electronic circuit through the buffer.

2. The electronic circuit device according to claim 1, wherein the thin film transistor of a lowest layer of the thin film transistors included in the electronic circuit is crystallized by a heat treatment, and the thin film transistor of another layer of the thin film transistors included in the electronic circuit is crystallized by irradiating a laser beam.

3. The electronic circuit device according to claim 2, wherein the heat treatment is a heat treatment using a metal catalyst.

4. The electronic circuit device according to claim 1, wherein the thin film transistors included in the electronic circuit are crystallized by a heat treatment.

5. The electronic circuit device according to claim 4, wherein the heat treatment is a heat treatment using a metal catalyst.

6. The electronic circuit device according to claim 1, wherein said optical sensor over said transparent substrate includes an amorphous silicon photodiode, or an amorphous silicon phototransistor.

7. The electronic circuit device according to claim 1, wherein said optical sensor over said transparent substrate includes a polysilicon (p-Si) photodiode, or a polysilicon phototransistor.

8. The electronic circuit device according to claim 1, wherein said optical shutter comprises a liquid crystal which is sandwiched between two transparent substrates.

9. The electronic circuit device according to claim 8, further comprising a polarizing plate, wherein said polarizing plate is disposed over said transparent substrate, and said polarizing plate is disposed only nearby said optical shutter.

10. An electronic circuit device comprising:
    a configuration in which a plurality of electronic circuit substrates are superimposed,
    wherein an optical shutter, an optical sensor, and an electronic circuit including a plurality of laminated layers are disposed over each of the electronic circuit substrates,
    wherein each of the plurality of laminated layers include thin film transistors,
    wherein the electronic circuit substrate is a transparent substrate,
    wherein said optical shutter controls transmission or non-transmission of a part of an optical signal from an outside,
    wherein the optical sensor is connected to an electric source through a thin film transistor, and connected to a buffer,
    wherein said optical sensor converts another part of said optical signal into an electronic signal, and
    wherein said electronic signal is inputted into the electronic circuit through the buffer.

11. The electronic circuit device according to claim 10, wherein the thin film transistor of a lowest layer of the thin film transistors included in the electronic circuit is crystallized by a heat treatment, and the thin film transistor of another layer of the thin film transistors included in the electronic circuit is crystallized by irradiating a laser beam.

12. The electronic circuit device according to claim 11, wherein the heat treatment is a heat treatment using a metal catalyst.

13. The electronic circuit device according to claim 10, wherein the thin film transistors included in the electronic circuit are crystallized by a heat treatment.

14. The electronic circuit device according to claim 13, wherein the heat treatment is a heat treatment using a metal catalyst.

15. The electronic circuit device according to claim 10, wherein said optical sensor over said transparent substrate includes an amorphous silicon photodiode, or an amorphous silicon phototransistor.

16. The electronic circuit device according to claim 10, wherein said optical sensor over said transparent substrate includes a polysilicon (p-Si) photodiode, or a polysilicon phototransistor.

17. The electronic circuit device according to claim 10, wherein said optical shutter comprises a liquid crystal which is sandwiched between two transparent substrates.

18. The electronic circuit device according to claim 17, further comprising a polarizing plate, wherein said polarizing plate is disposed over said transparent substrate, said polarizing plate is disposed only nearby said optical shutter.

19. An electronic circuit device comprising:
    an electronic circuit substrate over which an optical shutter, a plurality of optical sensors, and an electronic circuit including a plurality of laminated layers, wherein each of the plurality of laminated layers include thin film transistors, are disposed,
    wherein the electronic circuit substrate is a transparent substrate,
    wherein said optical shutter controls transmission or non-transmission of a part of an optical signal from an outside,
    wherein each of the optical sensors is connected to a respective electric source through a respective thin film transistor, and connected to a respective buffer,
    wherein said plurality of optical sensors convert another part of said optical signal into an electronic signal,
    wherein said electronic signal is inputted into the electronic circuit through the buffer, and
    wherein each of said optical sensor is formed on different layers from each other in the plurality of the laminated layers.

20. The electronic circuit device according to claim 19, wherein the thin film transistor of a lowest layer of the thin film transistors included in the electronic circuit is crystallized by a heat treatment, and the thin film transistor of another layer of the thin film transistors included in the electronic circuit is crystallized by irradiating a laser beam.

21. The electronic circuit device according to claim 20, wherein the heat treatment is a heat treatment using a metal catalyst.

22. The electronic circuit device according to claim 19, wherein the thin film transistors included in the electronic circuit are crystallized by a heat treatment.

23. The electronic circuit device according to claim 22, wherein the heat treatment is a heat treatment using a metal catalyst.

24. The electronic circuit device according to claim 19, wherein said plurality of optical sensors over said transparent substrate include an amorphous silicon photodiode, or an amorphous silicon phototransistor.

25. The electronic circuit device according to claim 19, wherein said plurality of optical sensors over said transparent substrate include a polysilicon (p-Si) photodiode, or a polysilicon phototransistor.

26. The electronic circuit device according to claim 19, wherein said optical shutter comprises a liquid crystal which is sandwiched between two transparent substrates.

27. The electronic circuit device according to claim 26, further comprising a polarizing plate, wherein said polarizing plate is disposed over said transparent substrate, said polarizing plate is disposed only nearby said optical shutter.

28. An electronic circuit device comprising:
an electronic circuit substrate over which an optical shutter, a plurality of optical sensors, and an electronic circuit including a plurality of laminated layers, wherein each of the plurality of laminated layers include thin film transistors, are disposed,
wherein the electronic circuit substrate is a transparent substrate;
wherein each of the optical sensors is connected to a respective electric source through a respective thin film transistor, and connected to a respective buffer,
wherein each of said optical sensors is formed on different layers from each other in the plurality of the laminated layers,
wherein each of said optical sensors is controlled by the thin film transistor connected to the optical sensor,
wherein said optical shutter controls transmission or non-transmission of a part of an optical signal from an outside,
wherein said plurality of optical sensors convert another part of said optical signal into an electronic signal, and
wherein said electronic signal is inputted into the electronic circuit through the buffer.

29. The electronic circuit device according to claim 28, wherein the thin film transistor of a lowest layer of the thin film transistors included in the electronic circuit is crystallized by a heat treatment, and the thin film transistor of another layer of the thin film transistors included in the electronic circuit is crystallized by irradiating a laser beam.

30. The electronic circuit device according to claim 29, wherein the heat treatment is a heat treatment using a metal catalyst.

31. The electronic circuit device according to claim 28, wherein the thin film transistors included in the electronic circuit are crystallized by a heat treatment.

32. The electronic circuit device according to claim 31, wherein the heat treatment is a heat treatment using a metal catalyst.

33. The electronic circuit device according to claim 28, wherein said plurality of optical sensors over said transparent substrate include an amorphous silicon photodiode, or an amorphous silicon phototransistor.

34. The electronic circuit according to claim 28, wherein said optical plurality of optical sensors over said transparent substrate include a polysilicon (p-Si) photodiode, or a polysilicon phototransistor.

35. The electronic circuit device according to claim 28, wherein said optical shutter comprises a liquid crystal which is sandwiched between two transparent substrates.

36. The electronic circuit device according to claim 35, further comprising a polarizing plate, wherein said polarizing plate is disposed over said transparent substrate, said polarizing plate is disposed only nearby said optical shutter.

* * * * *

UNITED STATES PATENT AND TRADEMARK OFFICE
CERTIFICATE OF CORRECTION

| | | |
|---|---|---|
| PATENT NO. | : 7,769,253 B2 | Page 1 of 1 |
| APPLICATION NO. | : 10/649661 | |
| DATED | : August 3, 2010 | |
| INVENTOR(S) | : Shigeki Imai et al. | |

It is certified that error appears in the above-identified patent and that said Letters Patent is hereby corrected as shown below:

In claim 34, at column 14, line 29, change "said optical plurality" to --said plurality--.

Signed and Sealed this
Fifteenth Day of March, 2011

David J. Kappos
*Director of the United States Patent and Trademark Office*